United States Patent
Cheng et al.

(10) Patent No.: US 10,596,529 B2
(45) Date of Patent: Mar. 24, 2020

(54) ROTARY EMULSIFICATION DEVICE STRUCTURE

(71) Applicant: Tamkang University, New Taipei (TW)

(72) Inventors: Tung-Wen Cheng, New Taipei (TW); Su-En Wu, New Taipei (TW)

(73) Assignee: TAMKANG UNVERSITY, New Taipei (TW)

( * ) Notice: Subject to any disclaimer, the term of this patent is extended or adjusted under 35 U.S.C. 154(b) by 190 days.

(21) Appl. No.: 15/958,140

(22) Filed: Apr. 20, 2018

(65) Prior Publication Data

US 2018/0353912 A1 Dec. 13, 2018

(30) Foreign Application Priority Data

Jun. 9, 2017 (TW) .............................. 106119351 A

(51) Int. Cl.
| | |
|---|---|
| *B01F 7/26* | (2006.01) |
| *C08J 3/03* | (2006.01) |
| *B01F 5/00* | (2006.01) |
| *B01F 3/08* | (2006.01) |
| *B01F 7/00* | (2006.01) |
| *B01F 13/10* | (2006.01) |

(52) U.S. Cl.
CPC .......... *B01F 3/0807* (2013.01); *B01F 3/0857* (2013.01); *B01F 7/00458* (2013.01); *B01F 7/00758* (2013.01); *B01F 7/26* (2013.01); *B01F 13/1016* (2013.01); *C08J 3/03* (2013.01)

(58) Field of Classification Search
CPC ................ B01F 3/0807; B01F 13/1016; B01F 7/00458; B01F 7/26; B01F 7/00758; B01F 3/0857; B01F 5/06; B01F 5/00; B01F 3/0853; C08J 3/03
USPC ........................................................ 366/279
See application file for complete search history.

(56) References Cited

U.S. PATENT DOCUMENTS 3,679,182 A * 7/1972 Clocker .................. B01F 5/162
366/263

FOREIGN PATENT DOCUMENTS

WO WO-2012086328 A1 * 6/2012 ............ C08F 210/16

* cited by examiner

*Primary Examiner* — Huy Tram Nguyen

(74) *Attorney, Agent, or Firm* — Birch, Stewart, Kolasch & Birch, LLP

(57) ABSTRACT

A rotary emulsification device structure includes a housing, a emulsification element and a rotary disk. The housing includes a chamber with a first inlet, a second inlet and an outlet. The emulsification element is disposed in the chamber and divides the chamber into a first space and a second space. The first inlet is disposed to communicate with the first space, and the second inlet and the outlet are disposed to communicate with the second space. The emulsification element includes a plurality of pores communicating with the first space and the second space. The rotary disk is disposed in the second space and rotates in the second space when being driven. The rotary disk includes a plurality of through holes.

22 Claims, 6 Drawing Sheets

ROTARY EMULSIFICATION DEVICE STRUCTURE

CROSS-REFERENCE TO RELATED APPLICATION

This non-provisional application claims priority under 35 U.S.C. § 119(a) to Patent Application No. 106119351 filed in Taiwan, R.O.C. on Jun. 9, 2017, the entire contents of which are hereby incorporated by reference.

BACKGROUND

Technical Field

This disclosure generally relates to an emulsification technology and, more particularly, to a rotary emulsification device structure.

Related Art

When two immiscible liquid phases (for example, oil and water) are mixed under the action of a surfactant, minute droplets of one liquid phase are uniformly dispersed in the other liquid phase to form an emulsified liquid. The liquid phase providing the droplets in the emulsified liquid is the dispersed phase, while the other liquid phase is the continuous phase. In general, static emulsifiers are commonly used for emulsification. When the two liquid phases come into contact in an emulsification element in a static emulsifier, the droplets formed in the dispersed phase spontaneously detach from the emulsification element into the continuous phase to achieve emulsification.

In the emulsification process, static emulsifiers are not involved with shearing forces, resulting in scale formation on the surface of the emulsification element and very low yield of the emulsified solution. In order to increase the yield of the emulsified solution, a dynamic emulsifier with stirring has developed. The shearing forces created when the two liquid phases are stirred facilitate the detachment of the droplets at the liquid-liquid interface from the emulsification element and reduce the formation of scale on the surface of the emulsification element. Additionally, the turbulent flow generated during stirring can also accelerate the two-phase compatibility. However, a common dynamic emulsifier is an emulsifier with blades mounted on a rotary disk such that the rotary disk is too heavy and consumes energy drastically.

SUMMARY

In one embodiment, a rotary emulsification device structure includes a housing, an emulsification element and a rotary disk. The housing includes a chamber with a first inlet, a second inlet and an outlet. The emulsification element is disposed in the chamber and divides the chamber into a first space and a second space. The first inlet is disposed to communicate with the first space, and the second inlet and the outlet are disposed to communicate with the second space. The emulsification element includes a plurality of pores communicating with the first space and the second space. The rotary disk is disposed in the second space and rotates in the second space when being driven. The rotary disk includes a plurality of through holes.

In one embodiment, a rotary emulsification device structure includes a housing and an emulsification element. The housing includes a chamber with a first inlet. The emulsification element includes a second inlet, an outlet, a plurality of pores and a rotary disk, is disposed in the chamber, and divides the chamber into a first space and a second space. The first inlet is disposed to communicate with the first space, and the second inlet and the outlet are disposed to communicate with the second space. The plurality of pores communicates with the first space and the second space. The rotary disk is disposed in the second space and rotates in the second space when being driven. The rotary disk includes a plurality of through holes.

The rotary emulsification device structure of this disclosure is suitable for preparing an emulsified solution. The through holes of the rotary disk stir the dispersed phase and the continuous phase with less energy consumption due to weight reduction of the rotary disk and improved emulsification effect due to increased turbulent flow and shearing force generated on the surface of the emulsification element during stirring. In addition, the increase of the turbulent flow also facilitates the increase of mutual dissolution rate.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
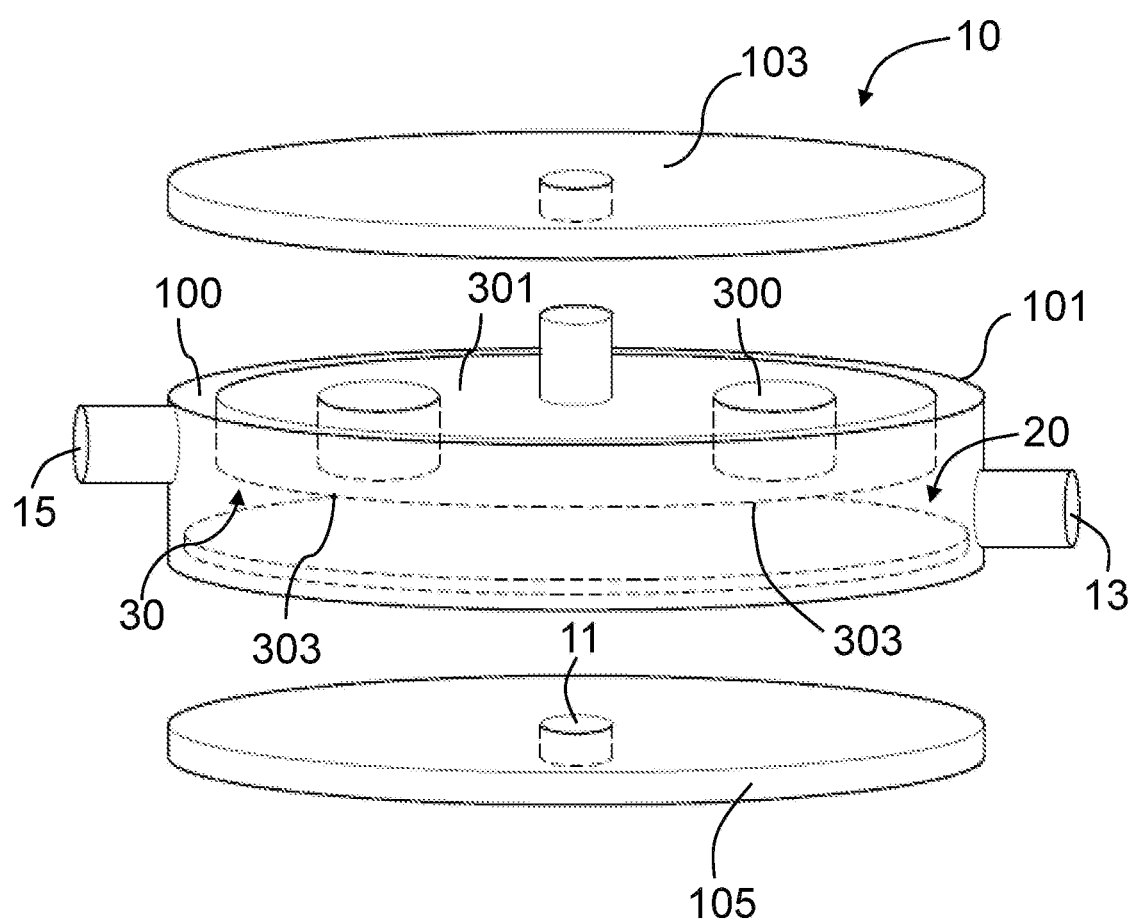
FIG. 1 illustrates a perspective view of a rotary emulsification device structure according to one embodiment of this disclosure.
Figure 2:
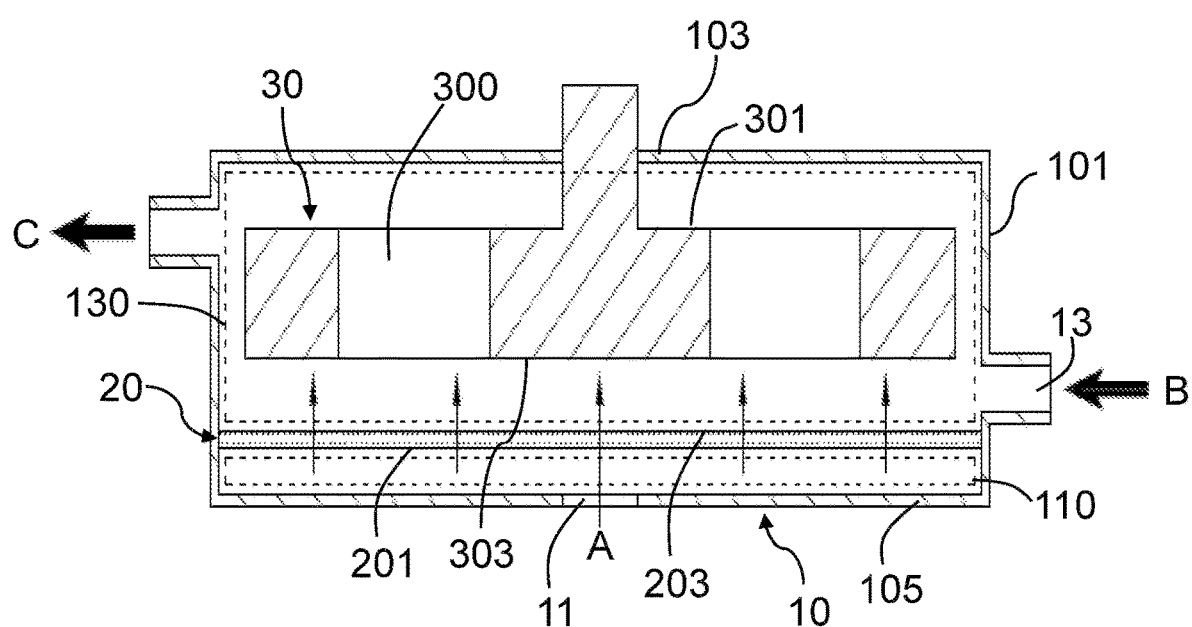
FIG. 2 illustrates a cross-sectional view of a first exemplary rotary emulsification device structure in FIG. 1.

With reference to FIG. 1 and FIG. 2, in some embodiments, a rotary emulsification device structure includes a housing 10, an emulsification element 20 and rotary disk 30. The housing 10 includes a chamber 100 with a first inlet 11, a second inlet 13 and an outlet 15. Each of the first inlet 11, the second inlet 13 and the outlet 15 may communicate with the chamber 100 through the housing 10. For example, the housing 10 may include a peripheral wall 101, a top wall 103 covering the upper side of the peripheral wall 101 and a bottom wall 105 covering the lower side of the peripheral wall 101 to define the chamber 100. The first inlet 11 extends through the bottom wall 105, while the second inlet 13 and the outlet 15 extend through the peripheral wall 101.

In some embodiments, the emulsification element 20 is disposed in the chamber 100 and divides the chamber 100 into a first space 110 and a second space 130. The first inlet 11 is disposed to communicate with the first space 110, while the second inlet 13 and the outlet 15 are disposed to communicate with the second space 130. In other words, the emulsification element 20 includes a plurality of pores communicating with the first space 110 and the second space 130.

In some embodiments, the rotary disk 30 is disposed in the second space 130 and rotates in the second space 130 when being driven. In some embodiments, the rotary disk 30 may be driven to rotate by manual or motor power.

In some embodiments, the rotary disk 30 may include a plurality of through holes 300. The rotary disk 30 may further include a primary plane 301 and a secondary plane 303 opposite to the primary plane 301. The through holes 300 may extend through the primary plane 301 and secondary plane 303.

In some embodiments, the rotary disk 30 may include two to four through holes 300. Compared to a rotary disk without through holes, the shearing force generated by the rotary disk 30 including two through holes 300 is increased by 40% to 50%, while the shearing force generated by the rotary disk 30 including four through holes 300 is increased by 110% to 150%.

In some embodiments, the primary plane 301 of the rotary disk 30 may be substantially in parallel with the emulsification element 20. In other words, the primary plane 301 may be substantially in parallel with a surface (herein, the lower surface 201) of the emulsification element 20 facing the first space 110 and/or a surface (herein, the upper surface 203) facing the second space 130.

In some embodiments, the secondary plane 303 of the rotary disk 30 may also be substantially in parallel with the emulsification element 20. In other words, the secondary plane 303 may also be substantially in parallel with the lower surface 201 and/or the upper surface 203 of the emulsification element 20.

In some embodiments, the outlet 15 is disposed higher than the first inlet 11 and the second inlet 13 according to the primary plane 301 of the rotary disk 30 as a reference.

In some embodiments, the dispersed phase and the continuous phase are two immiscible liquid phases. For example, the dispersed phase can be an oil phase and the continuous phase can be an aqueous phase and vice versa. In some embodiments, an emulsification agent may be added to the dispersed phase and the continuous phase, respectively, to form a dispersed-phase solution A and a continuous-phase solution B. When the dispersed-phase solution A passes through the pores in the emulsification element 20, droplets of a specific size may be formed according to the dimension of the pores.

In some embodiments, the axial direction of the first inlet 11 may be substantially perpendicular to the lower surface 201 of the emulsification element 20, and the axial direction of the second inlet 130 may be substantially in parallel with the upper surface 203 of the emulsification element 20. Additionally, in some embodiments, the angle between the axial direction of the second inlet 13 and the upper surface 203 of the emulsification element 20 may be an acute angle so as to increase the mixing rate of the continuous-phase solution B entering the second space 130 from the second inlet 13 and the dispersed-phase solution A passing through the pores in the emulsification element 20 and thus enhance emulsification.

For example, after entering the first space 110 from the first inlet 11, the dispersed-phase solution A passes through the pores in the emulsification element 20 to enter the second space 130 and form droplets. The continuous-phase solution B enters the second space 130 from the second inlet 13 and is mixed with the droplet-shaped dispersed-phase solution A. The rotary disk 30 rotates, after being driven, to stir and emulsify the mixture of the dispersed-phase solution A and the continuous-phase solution B to obtain an emulsified solution C. At last, the emulsified solution C flows out through the outlet 15.

Since the liquid-liquid interface between the dispersed-phase solution A and the continuous-phase solution B is located on the upper surface 203 or in the vicinity of the upper surface 203 of the emulsification element 20, a part of or all of the emulsified solution C accumulates on the upper surface 203 and forms scale. When the rotary disk 30 rotates, a shearing force is generated on the upper surface 203 of the emulsification element 20 to facilitate the emulsified solution C accumulated on the upper surface 203 to be detached and move to the second space 130 to avoid scale formation. The through holes 300 of the rotary disk 30 enhance the shearing force generated on the upper surface 201 of the emulsification element 20 and reduce the weight of the rotary disk 30 to reduce energy consumption when the rotary disk 30 rotates.

Figure 3:
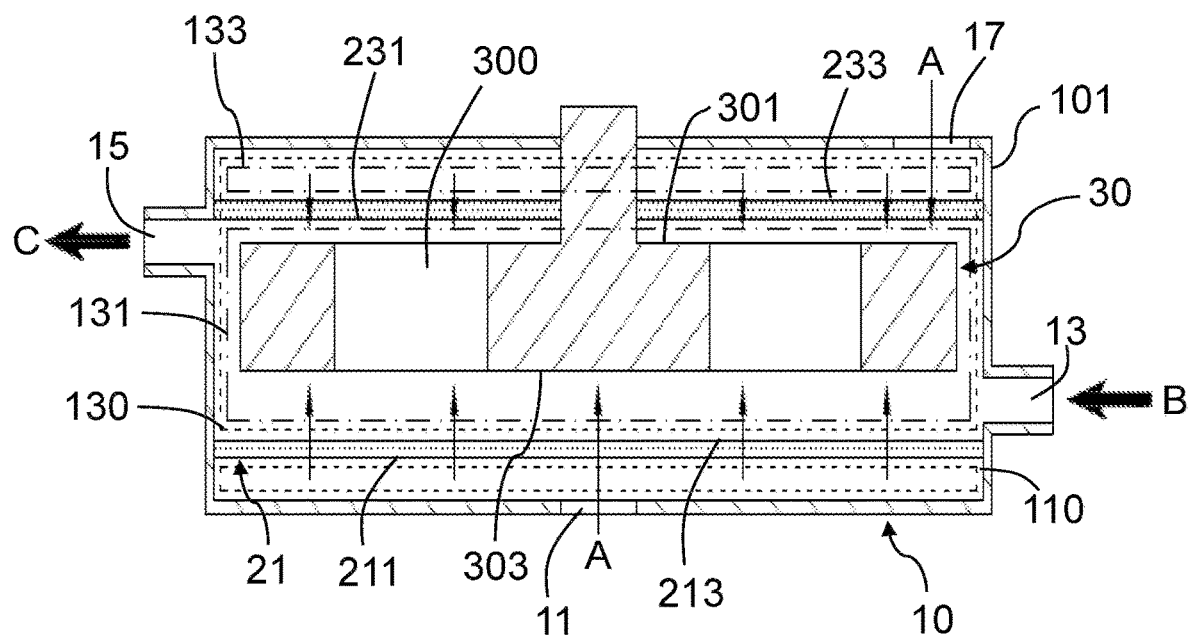
FIG. 3 illustrates a cross-sectional view of a second exemplary rotary emulsification device structure in FIG. 1.

With reference to FIG. 3, in some embodiments, a rotary emulsification device structure may include a first emulsification element 21 and a second emulsification element 23. The first emulsification element 21 may be disposed in the chamber 100 and divide the chamber 100 into a first space 110 and a second space 130. The second emulsification element 23 may be disposed in the second space 130 and divide the second space 130 into a first sub-space 131 and a second sub-space 133. The first emulsification element 21 has a plurality of pores communicating with the first space 110 and the first sub-space 131, and the second emulsification element 23 has a plurality of pores communicating with the first sub-space 131 and the second sub-space 133. Additionally, the first inlet 11 is disposed to communicate with the first space 110, and the second inlet 13 and the outlet 15 are disposed to communicate with the first sub-space 131.

In some embodiments, the housing 10 may include a third inlet 17, and the third inlet 17 is disposed to communicate with the second sub-space 133. In some embodiments, the third inlet 17 extends through a top wall 103 of the housing 10.

In some embodiments, the axial direction of the first inlet 11 may be substantially perpendicular to the surface (herein, the lower surface 211) of the first emulsification element 21 facing the first space 110, and the axial direction of the third inlet 17 may be substantially perpendicular to the surface (herein, the upper surface 233) of the second emulsification element 23 facing the second sub-space 133.

Moreover, in some embodiments, the axial direction of the second inlet 13 may be substantially in parallel with the surface (herein, the upper surface 213) of the first emulsification element 21 facing the first sub-space 131. In some embodiments, the angle between the axial direction of the second inlet 13 and the upper surface 233 of the second emulsification element 23 may be acute.

In some embodiments, the rotary disk 30 may be disposed in the first sub-space 131. The primary plane 301 of the rotary disk 30 may be substantially in parallel with the upper surface 213 of the first emulsification element 21 and/or the lower surface 231 of the second emulsification element 23. In addition, in some embodiments, the secondary plane 303 of the rotary disk 30 may also be substantially in parallel with the upper surface 213 of the first emulsification element 21 and/or the lower surface 231 of the second emulsification element 23.

For example, the dispersed-phase solution A enters the first space 110 from the first inlet 11 and passes through the pore of the first emulsification element 21. Additionally, the dispersed-phase solution A also enters the second sub-space 133 from the third inlet 17. The dispersed-phase solution A that has passed through the pores enters the first sub-space 131 and forms droplets. The continuous-phase solution B enters the first sub-space 131 from the second inlet 13 and is mixed with the droplet-shaped dispersed-phase solution A. After the rotary disk 30 is driven and rotated, a mixture of the dispersed-phase solution A and the continuous-phase solution B is stirred and emulsified to obtain an emulsified solution C. Finally, the emulsified solution C flows out through the outlet 15.

Since the liquid-liquid interface between the dispersed-phase solution A and the continuous-phase solution B is located on the lower surface 211 or in the vicinity of the upper surface 213 of the first emulsification element 21 and/or on the lower surface 231 or in the vicinity of the lower surface 231 of the second emulsification element 23, a part or all of the first emulsified solution C1 accumulates on the lower surface 231 of the second emulsification element 23 while a part or all of the second emulsified solution C2 accumulates on the upper surface 213 of the first emulsification element 21 and forms scale. When the rotary disk 30 rotates, a shearing force is generated on the upper surface 213 of the first emulsification element 21 and/or the lower surface 231 of the second emulsification element 23 so as to facilitate the emulsified solution C accumulated on the upper surface 213 of the first emulsification element 21 and/or on the lower surface 231 of the second emulsification elements 23 to be detached and move to the first sub-space 131 to avoid the formation of scale. Similarly, the through holes 300 of the rotary disk 30 enhance the shearing force generated on the upper surface 213 of the first emulsification element 21 and/or the lower surface 231 of the second emulsification element 23 and reduce the weight of the rotary disk 30 to reduce energy consumption when the rotary disk 30 rotates.

Figure 4:
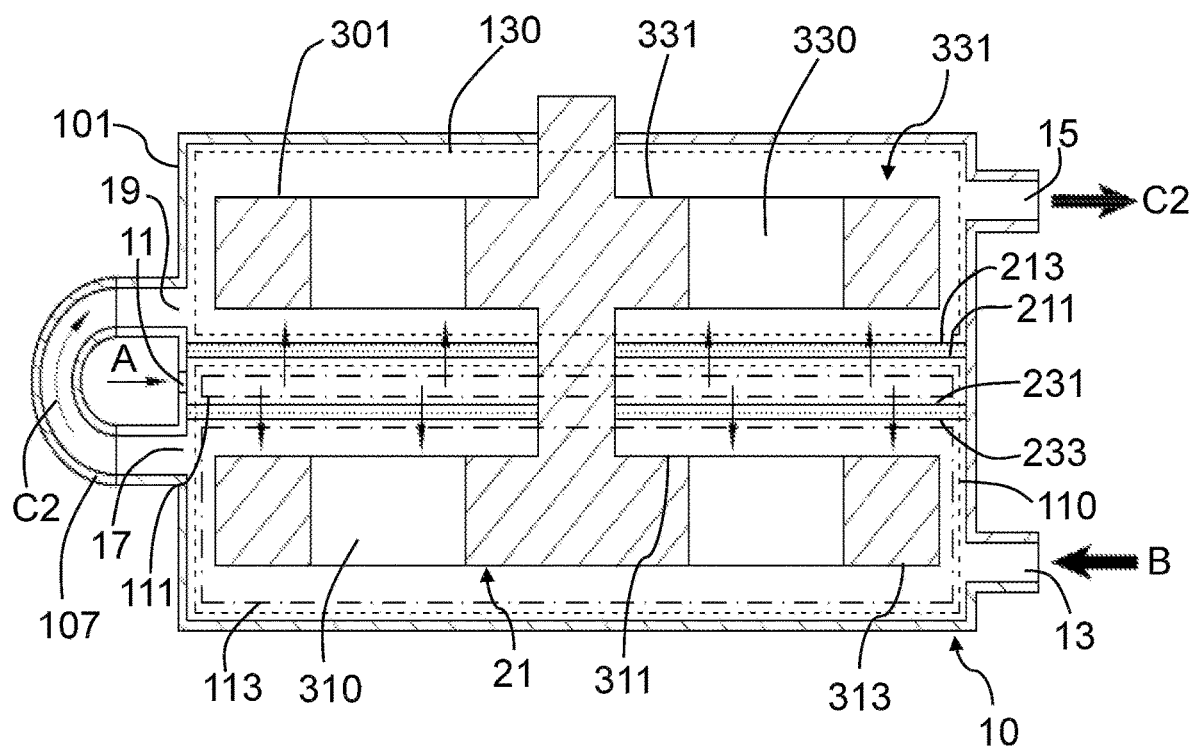
FIG. 4 illustrates a cross-sectional view of a third exemplary rotary emulsification device structure in FIG. 1.

With reference to FIG. 4, in some embodiments, the first emulsification element 21 may be disposed in the chamber 100 and divide the chamber 100 into a first space 110 and a second space 130. The second emulsification element 23 may be disposed in the first space 110 and divide the first space 110 into a third sub-space 111 and a fourth sub-space 113. The pores of the first emulsification element 21 communicate with the third sub-space 111 and the fourth sub-space 113, and the pores of the second emulsification element 23 communicate with the fourth sub-space 113 and the second space 130. The first inlet 11 may be disposed to communicate with the third sub-space 111, and the second inlet 13 and third inlet 17 may be disposed to communicate with the fourth sub-space 113.

In some embodiments, the housing 10 may include a fourth inlet 19 disposed to communicate with the second space 130. The fourth inlet 19 may communicate with the third inlet 17. For example, the housing 10 may further include a flow channel 107 disposed on the peripheral wall 101. The third inlet 17 and the fourth inlet 19 are respectively disposed at two ends of the flow channel 107 and communicate with each other.

Additionally, in some embodiments, the first inlet 11, the second inlet 13, the outlet 15, the third inlet 17, and the fourth inlet 19 may extend through the peripheral wall 101 of the housing 10.

In some embodiments, the axial direction of the first inlet 11 may be substantially in parallel with the surface (i.e., the lower surface 211) of the first emulsification element 21 facing the third sub-space 111 and/or the surface (i.e., the upper surface 233) of the second emulsification element 23 facing the third sub-space 111. The axial direction of the third inlet 17 may be substantially in parallel with the surface (i.e., the lower surface 231) of the second emulsification element 23 facing the fourth sub-space 113. The axial direction of the fourth inlet 19 may be substantially in parallel with the surface (i.e., the upper surface 213) of the first emulsification element 21 facing the second space 130.

Additionally, in some embodiments, the axial direction of the third inlet 17 may be substantially in parallel with the axial direction of the fourth inlet 19.

In some embodiments, when the rotary emulsification device structure includes a rotary disk 30, the rotary disk 30 may be disposed in the fourth sub-space 111 or the second space 130.

In some embodiments, the rotary emulsification device structure may include a first rotary disk 31 disposed in the fourth sub-space 113 and a second rotary disk 33 disposed in the second space 130. The first rotary disk 31 and the second rotary disk 33 may include a primary plane 311, 331 and a secondary plane 313, 333 opposite to the primary plane 311, 331, respectively. The through holes 310 of the first rotary disk 31 can extend through the primary plane 311 and the secondary plane 313. The through holes 330 of the second rotary disk 33 can extend through the primary plane 331 and the secondary plane 333.

In some embodiments, the first rotary disk 31 may include two to four through holes 310. In some embodiments, the second rotary disk 33 may include two to four through holes 330.

In some embodiments, the primary plane 311 and the secondary plane 313 of the first rotary disk 31 may be substantially in parallel with each other. In some embodiments, the primary plane 331 and the secondary plane 333 of the second rotary disk 33 may also be substantially in parallel with each other.

In some embodiments, the outlet 15 may be disposed higher than the first inlet 11, the second inlet 13, the third inlet 17 and the fourth inlet 19 according to the primary plane 311 of the first rotary disk 31 as a reference.

In some embodiments, the shearing force generated by the first rotary disk 31 with two through holes 310 can be increased by 40% to 50% compared to a rotary disk having no through holes, and the shearing force generated by the first rotary disk 31 with four through holes 310 can be increased by 110% to 150%. Similarly, the shearing force generated by the second rotary disk 33 with two through holes 330 can be increased by 40% to 50% and the shearing force generated by the second rotary disk 33 with four through holes 330 can be increased by 110% to 150%.

In some embodiments, the primary plane 311 of the first rotary disk 31 may be substantially in parallel with the second emulsification element 23. In other words, the primary plane 311 of the first rotary disk 31 may be substantially in parallel with the lower surface 231 and/or the upper surface 233 of the second emulsification element 23.

In some embodiments, the primary plane 331 of the second rotary disk 33 may be substantially in parallel with the first emulsification element 21. In other words, the primary plane 331 of the second rotary disk 33 may be substantially in parallel with the lower surface 211 and/or the upper surface 213 of the first emulsification element 21.

For example, the dispersed-phase solution A enters the third sub-space 111 from the first inlet 11, passes through the pores in the first emulsification element 21 and the pores in the second emulsification element 23, and forms droplets. The dispersed-phase solution A passing through the pores in the second emulsification element 23 enters the fourth sub-space 113, and the dispersed-phase solution A passing through the pores in the first emulsification element 21 enters the second space 13. The continuous-phase solution B enters the fourth sub-space 113 from the second inlet 13 and is mixed with the droplet-shaped dispersed-phase solution A. The first rotary disk 31 rotates, after being driven, to stir the mixture of the dispersed-phase solution A and the continuous-phase solution B in the fourth sub-space 113 to perform a first emulsification to obtain a first emulsified solution C1. The first emulsified solution C1 flows through the third inlet 17 disposed to communicate with the fourth sub-space 113 to the fourth inlet 19 disposed to communicate with the second space 130 and enters the second space 130.

Then, in the second space 130, the first emulsified solution C1 is mixed with the dispersed-phase solution A passing through the pores in the first emulsification element 21. The second rotary disk 33 rotates, after being driven, to stir the mixture of the dispersed-phase solution A and the first emulsified solution C1 in the second space 130 to perform a second emulsification to obtain a second emulsified solution C2. Finally, the second emulsified solution C2 flows out through the outlet 15.

Since the liquid-liquid interface between the dispersed-phase solution A and the continuous-phase solution B is located on the upper surface 213 or in the vicinity of the upper surface 213 of the first emulsification element 21 and/or on the lower surface 231 or in the vicinity of the lower surface 231 of the second emulsification element 23, a part or all of the first emulsified solution C1 accumulates on the lower surface 231 of the second emulsification element 23, while a part or all of the second emulsified solution C2 accumulates on the upper surface 213 of the first emulsification element 21 and forms scale.

When the first rotary disk 31 rotates, a shearing force is generated on the lower surface 231 of the second emulsification element 23 to facilitate the first emulsified solution C1 accumulated on the lower surface 231 of the second emulsification element 23 to be detached and move to the fourth sub-space 131. When the second rotary disk 30 rotates, a shearing force is generated on the upper surface 213 of the first emulsification element 21 to facilitate the second emulsified solution C2 accumulated on the upper surface 213 of the first emulsification element 21 to be detached and move to the second space 131. Here, the formation of scale can be avoided. The through holes 310 of the first rotary disk 31 enhance the shearing force generated on the lower surface 231 of the second emulsification element 23 when the first rotary disk 31 rotates, and the through holes 330 of the second rotary disk 33 enhance the shearing force generated on the upper surface 213 of the first emulsification element 21 when the second rotary disk 33 rotates. Additionally, the through holes 310, 330 are provided to reduce the weights of the first rotary disk 31 and second rotary disk 33 to reduce energy consumption during rotation thereof.

Figure 5:
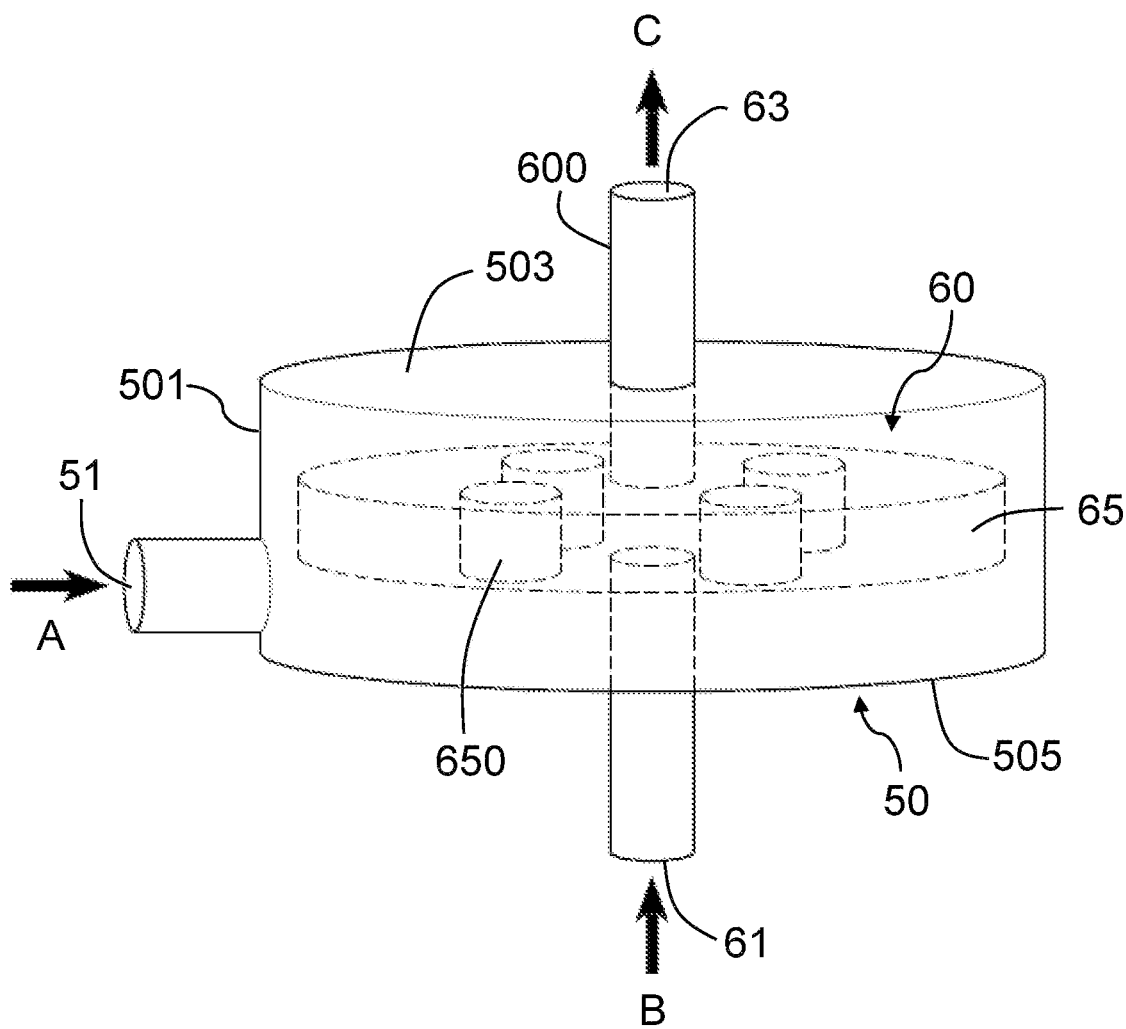
FIG. 5 illustrates a perspective view of a rotary emulsification device structure according to another embodiment of this disclosure.
Figure 6:
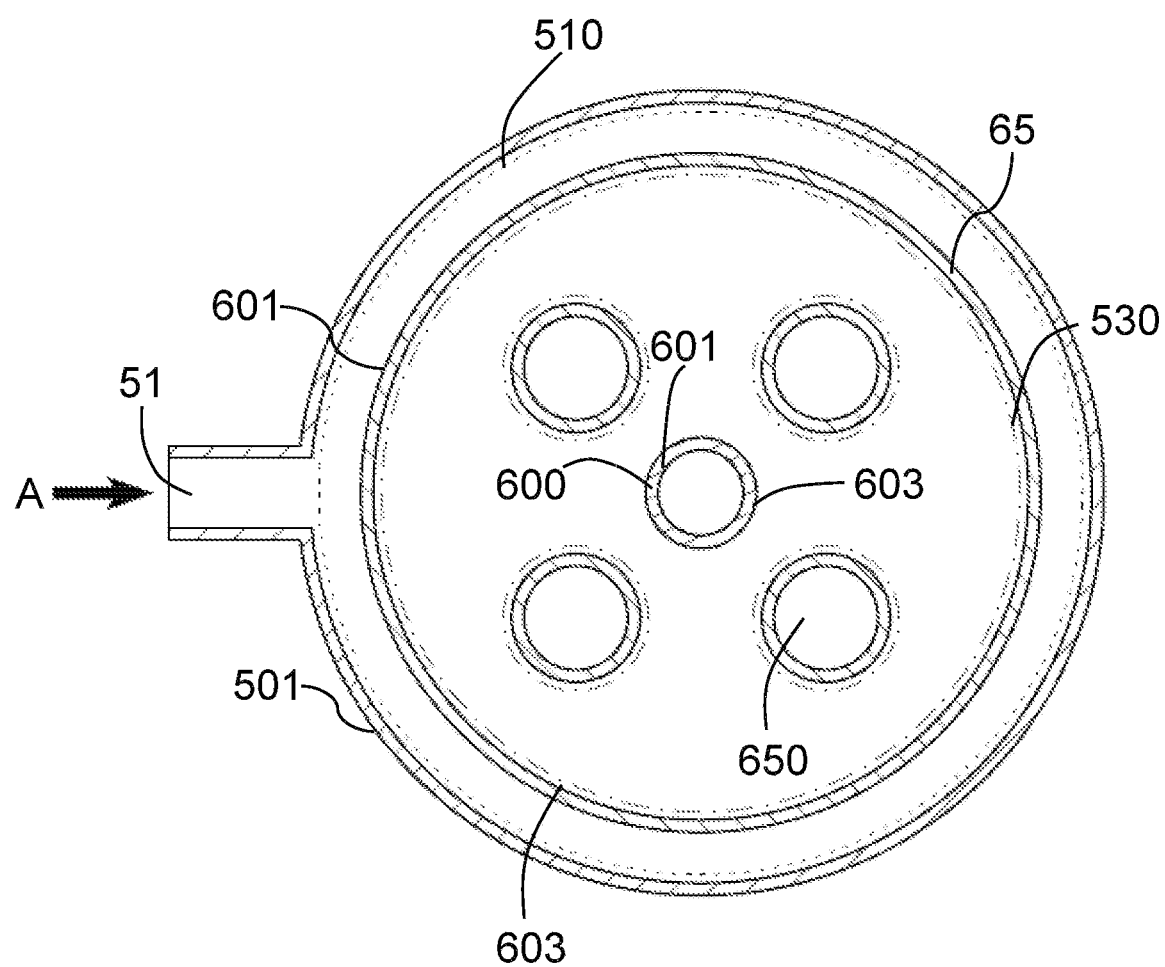
FIG. 6 illustrates a top view of a rotary emulsification device structure in FIG. 5.

With reference to FIG. 5 and FIG. 6, in some embodiments, a rotary emulsification device structure includes a housing 50 and an emulsification element 60. The housing 50 includes a chamber 500 with a first inlet 51. For example, the housing 50 may include a peripheral wall 501, a top wall 503 covering the peripheral wall 501 from the top, and a bottom wall 505 covering the peripheral wall 501 from the bottom to define the chamber 500. The first inlet 51 may extend through the peripheral wall 501.

In some embodiments, the emulsification element 60 is hollow and is disposed in the chamber 500. The emulsification element 60 divides the chamber 500 into a first space 510 and a second space 530. Herein, the first space 510 is located between the housing 50 and the emulsification element 60 while the second space 530 is located in the emulsification element 60. The first inlet 51 may communicate with the first space 510.

In some embodiments, the emulsification element 60 may include a second inlet 61, an outlet 63, and a rotary disk 65. The second inlet 61 and the outlet 63 may communicate with the second space 530. The rotary disk 65 may rotate in the chamber 500 when being driven, and the rotary disk 65 includes a plurality of through holes 650.

In addition, in some embodiments, the emulsification element 60 may include a plurality of pores communicating with the first space 510 and the second space 530.

In some embodiments, compared to a rotary disk without through holes, the shearing force generated by the rotary disk 65 with two through holes 650 is increased by 40% to 50%, while the shearing force generated by the rotary disk 65 with four through holes 650 is increased by 110% to 150%.

In some embodiments, the rotary disk 65 may include a primary plane 651 and a secondary plane 653 opposite to the primary plane 651, and the through holes 650 of the rotary disk 65 may extend through the primary plane 651 and the secondary plane 653.

In some embodiments, the primary plane 651 and the secondary plane 653 of the rotary disk 65 may be substantially in parallel with each other.

In some embodiments, the outlet 63 of the rotary disk 65 is disposed higher than the first inlet 51 of the housing 50 and higher than the second inlet 61 and the outlet 63 of the emulsification element 60 according to the primary plane 651 of the rotary disk 65 as a reference.

In some embodiments, the axial direction of the second inlet 61 and the outlet 63 may be coaxial.

In some embodiments, the emulsification element 60 may further include a tube 600. Both ends of the tube 600 are connected to the housing 50. For example, both ends of the tube 600 may be connected to the top wall 503 and the bottom wall 505 of the housing 50, respectively. The second inlet 61 and the outlet 63 are disposed at the two ends of the tube 600, respectively. The rotary disk 65 may be disposed on the tube 600 and the tube 600 may be coaxial with the central axis of the rotary disk 65.

In some embodiments, two ends of the tube 600 are pivotably connected to the housing 50, respectively, and the rotary plate 65 can be fixedly attached to the tube 600. The tube 600 can be driven to rotate and drive the rotary disk 65 to rotate together.

In some embodiments, the emulsification element 60 and the rotary disk 65 may be formed as one piece.

In some embodiments, the two ends of the tube 600 are fixedly connected to the housing 50, respectively, and the rotary disk 65 is pivotably connected to the tube 600.

For example, after entering the first space 510 from the first inlet 51, the dispersed-phase solution A passes through the pores in the emulsification element 60 to enter the second space 530 and form droplets. The continuous-phase solution B enters the second space 530 from the second inlet 61 and is mixed with the droplet-shaped dispersed-phase solution A. The tube 600 or the rotary disk 65 is driven to rotate the rotary disk 65 to stir and emulsify the mixture of the dispersed-phase solution A and the continuous-phase solution B to obtain an emulsified solution C. At last, the emulsified solution C flows out through the outlet 63.

Since the liquid-liquid interface between the dispersed-phase solution A and the continuous-phase solution B is located on a surface (herein, the inner surface 603) of the emulsification element 60 facing the second space 530 or in the vicinity of the inner surface 603 of the emulsification element 60, a part of or all of the emulsified solution C accumulates on the inner surface 603 and forms scale. When the rotary disk 65 rotates, a shearing force is generated on the inner surface 603 of the emulsification element 60 to facilitate the emulsified solution C accumulated on the inner surface 603 to be detached and move to the second space 530 to avoid scale formation. The through holes 650 of the rotary disk 65 enhance the shearing force generated on the inner surface 603 of the emulsification element 60 and reduce the weight of the rotary disk 65 to reduce energy consumption when the rotary disk 65 rotates.

In any of the embodiments of this disclosure, the through holes of the rotary disk may be symmetrically arranged. For example, the through holes 300 of the rotary disk 30 may be point-symmetric with respect to the central axial direction of the rotary disk 30 or may be symmetric with respect to a radial direction of the rotary disk 30.

In any of the embodiments of this disclosure, the rotational speed of the rotary disk is 500 revolutions per minute (rpm) to 3000 rpm.

In any of the embodiments of this disclosure, the pores in the emulsification element have an average dimension of 0.001 micrometers to 1000 micrometers.

In any of the embodiments of this disclosure, the material of the emulsification element may be a hydrophilic material, a hydrophobic material, or a combination thereof.

In any of the embodiments of this disclosure, the material of the emulsification element contacting the surface of the dispersed-phase solution and the material contacting the surface the continuous-phase solution may be different. For example, the material of the lower surface 201 of the emulsification element 20 may be hydrophobic, and the material of the upper surface 203 of the emulsification element 20 may be hydrophilic. Herein, when the dispersed-phase solution A in the first space 110 is an oil-phase solution, the oil-phase solution may tend to flow near the lower surface 201 of the emulsification element 20 and pass through the emulsification element 20 into the second space 130. The oil phase solution in the second space 130 may tend to detach from the upper surface 203 of the emulsification element 20 and disperse in the aqueous-phase solution (i.e., the continuous-phase solution B).

In any embodiment of this disclosure, the material of the emulsification element may be ceramic, fiberglass, Shirasu Porous Glass (SPG), metal, polyvinylidene fluoride, nylon, mixed fiber, regenerated fiber, Teflon, activated carbon or ion exchange resin, other alternative materials, or a combination of any two or more thereof.

Additionally, in any embodiment of this disclosure, the emulsification element may be formed as one piece.

As stated above, the rotary emulsification device structure of this disclosure is suitable for preparing an emulsified solution. The through holes of the rotary disk stir the dispersed phase and the continuous phase with less energy consumption due to weight reduction of the rotary disk and improved emulsification effect due to increased turbulent flow and shearing force generated on the surface of the emulsification element during stirring. In addition, the increase of the turbulent flow also facilitates the increase of mutual dissolution rate.

While this disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation to encompass all such modifications and similar structures.

What is claimed is:

1. A rotary emulsification device structure, comprising:
a housing comprising a chamber with a first inlet, a second inlet and an outlet;
a first emulsification element disposed in said chamber and dividing said chamber into a first space and a second space, said first inlet being disposed to communicate with said first space, said second inlet and said outlet being disposed to communicate with said second space, and said first emulsification element comprising a plurality of pores communicating with said first space and said second space; and
a rotary disk disposed in said second space and rotating in said second space when being driven, said rotary disk comprising a plurality of through holes.

2. The rotary emulsification device structure according to claim 1, wherein said rotary disk comprises a primary plane and a secondary plane opposite to said primary plane, and said plurality of through holes extend through said rotary disk to communicate with said primary plane and said secondary plane.

3. The rotary emulsification device structure according to claim 2, wherein said plurality of through holes are arranged symmetrically.

4. The rotary emulsification device structure according to claim 3, wherein said rotary disk comprises two to four through holes.

5. The rotary emulsification device structure according to claim 3, wherein said primary plane is substantially in parallel with said first emulsification element.

6. The rotary emulsification device structure according to claim 1, wherein said rotary disk comprises a primary plane and a secondary plane opposite to said primary plane, and said plurality of through holes are arranged symmetrically and extend through said rotary disk to communicate with said primary plane and said secondary plane, said primary plane being substantially in parallel with said first emulsification element and said outlet being disposed higher than said first inlet and said second inlet according to said primary plane as a reference.

7. The rotary emulsification device structure according to claim 1, wherein said housing further comprises a third inlet, and said rotary emulsification device structure further comprises a second emulsification element disposed in said second space and dividing said second space into a first sub-space and a second sub-space such that said plurality of pores in said first emulsification element communicate with said first space and said first sub-space, said second emulsification element comprising a plurality of pores communicating with said first sub-space and said second sub-space, said second inlet and said outlet being disposed to communicate with said first sub-space, said third inlet being disposed to communicate with said second sub-space, and said rotary disk being disposed in said first sub-space.

8. The rotary emulsification device structure according to claim 1, wherein said housing further comprises a third inlet and a fourth inlet communicating with said third inlet, and said rotary emulsification device structure further comprises a second emulsification element disposed in said first space and dividing said first space into a third sub-space and a fourth sub-space such that said plurality of pores in said first emulsification element communicate with said second space and said third sub-space, said second emulsification element comprising a plurality of pores communicating with said third sub-space and said fourth sub-space, said first inlet being disposed to communicate with said third sub-space, said second inlet and said third inlet being disposed to communicate with said fourth sub-space, said fourth inlet being disposed to communicate with said second space, and said rotary disk being disposed in said fourth sub-space.

9. The rotary emulsification device structure according to claim 8, further comprising an additional rotary disk disposed in said second space.

10. The rotary emulsification device structure according to claim 1, wherein said plurality of pores have an average dimension within a range from 0.001 μm to 1000 μm.

11. The rotary emulsification device structure according to claim 1, wherein the distance between said first emulsification element and said rotary disk is within a range from 3 mm to 10 mm, and the rotational speed of said rotary disk is 500 revolutions per minute (rpm) to 3000 rpm.

12. The rotary emulsification device structure according to claim 1, wherein said first emulsification element comprises a hydrophilic material, a hydrophobic material or a combination thereof.

13. The rotary emulsification device structure according to claim 12, wherein said first emulsification element is formed as one piece, and first said emulsification element comprises ceramics, glass fiber, Shirasu porous glass (SPG), metal, polyvinylidene fluoride, nylon, mixed fibers, recycled fibers, polytetrafluoroethylene, activated carbon, ion-exchange resin or a combination thereof.

14. A rotary emulsification device structure, comprising:
a housing comprising a chamber with a first inlet; and
an emulsification element comprising a second inlet, an outlet, a plurality of pores and a rotary disk, disposed in said chamber and dividing said chamber into a first space and a second space, said first inlet being disposed to communicate with said first space, said second inlet and said outlet being disposed to communicate with said second space, said plurality of pores communicating with said first space and said second space, said rotary disk being disposed in said second space and rotating in said second space when being driven, and said rotary disk comprising a plurality of through holes.

15. The rotary emulsification device structure according to claim 14, wherein said rotary disk comprises a primary plane and a secondary plane opposite to said primary plane, and said plurality of through holes extend through said rotary disk to communicate with said primary plane and said secondary plane.

16. The rotary emulsification device structure according to claim 15, wherein said plurality of through holes are arranged symmetrically.

17. The rotary emulsification device structure according to claim 16, wherein said rotary disk comprises two to four through holes.

18. The rotary emulsification device structure according to claim 14, wherein said rotary disk comprises a primary plane and a secondary plane opposite to said primary plane, and said plurality of through holes are arranged symmetrically and extend through said rotary disk to communicate with said primary plane and said secondary plane, said primary plane being substantially in parallel with said emulsification element and said outlet being disposed on said primary plane higher than said second inlet.

19. The rotary emulsification device structure according to claim 14, wherein said plurality of pores have an average dimension within a range from 0.001 μm to 1000 μm.

20. The rotary emulsification device structure according to claim 18, wherein the rotational speed of said rotary disk is 500 revolutions per minute (rpm) to 3000 rpm.

21. The rotary emulsification device structure according to claim 14, wherein said emulsification element comprises a hydrophilic material.

22. The rotary emulsification device structure according to claim 21, wherein said emulsification element is formed as one piece, and said emulsification element comprises ceramics, glass fiber, Shirasu porous glass (SPG), metal, polyvinylidene fluoride, nylon, mixed fibers, recycled fibers, polytetrafluoroethylene, activated carbon, ion-exchange resin or a combination thereof.

* * * * *